June 5, 1962  L. D. BARRY  3,038,066
TRAIN TO TRAIN AND TRACK TO TRAIN CONTROL
Filed July 2, 1957  7 Sheets-Sheet 1

INVENTOR:
Leonard Dodge Barry

June 5, 1962 L. D. BARRY 3,038,066
TRAIN TO TRAIN AND TRACK TO TRAIN CONTROL
Filed July 2, 1957 7 Sheets-Sheet 3

INVENTOR:
Leonard Dodge Barry

Fig. 11

June 5, 1962  L. D. BARRY  3,038,066
TRAIN TO TRAIN AND TRACK TO TRAIN CONTROL
Filed July 2, 1957  7 Sheets-Sheet 5

Fig. 12

INVENTOR:
Leonard Dodge Barry

United States Patent Office

3,038,066
Patented June 5, 1962

3,038,066
TRAIN TO TRAIN AND TRACK TO TRAIN CONTROL
Leonard Dodge Barry, 19300 Pennington Drive, Detroit 21, Mich.
Filed July 2, 1957, Ser. No. 669,632
34 Claims. (Cl. 246—34)

This invention relates to signaling and automatic control, and in particular to a system and means providing control to and between separate rail vehicles.

Present automatic control systems insure that a safe distance between trains is maintained, whereas my original pending patent application Serial No. 146,767, filed February 28, 1950, and now abandoned and replaced by my continuing application Serial No. 564,511, filed February 9, 1956, provides a means for trains to follow each other at the same speed or a safe difference of speed without necessarily requiring a minimum distance between trains. It is an object of this invention to provide a system for automatic control and signaling between trains or rail vehicles which does not depend on a contact conductor other than the rails to provide a control circuit between trains or separate rail vehicles.

A general object is to provide a control signal system especially suited for limiting the speed of a vehicle to a reference speed set according to road or traffic conditions, and further to automatically and adjustably limit vehicle speed along a route.

Some further objects are to provide a train to train speed control system having: simple and inexpensive trackway installations; suitability for installation on present freight and passenger trains to permit close scheduling of trains and prevent end collisions; safety in case of failure of any equipment of this invention; speed control which is comprehensive of whether trains are approaching or receding, thereby enabling the stopping of a following train to not influence the speed of a forward train and thereby eliminate the need for a stopping zone as required for the system disclosed in my above mentioned patent applications; and further to provide a system suitable for two-way traffic over one track.

A train is herein generally defined as one or more railway vehicles coupled together. Such a train is also called a rail unit.

This invention is briefly a system which comprehends inductive signaling and control to and between trains. This is based on the principle later discussed in connection with the drawings that the rails between trains bridged by the wheels and axles of the trains provide a low resistance link, which can be used for transmitting and receiving signals between trains. Coils mounted with inductive relation to the rails at the ends of the train are used as transmitters and receivers. A signal indicating train speed is transmitted from the front of the train, and a different signal indicating the speed is transmitted from the rear. A signal transmitted from the front is called a front signal. A signal from the rear is called a rear signal. The rear signal is received by a front induction coil of a following train, amplified, compared with the speed of the receiving train and interpreted for indication or control of the speed of the receiving train with respect to the velocity of the train ahead. The front signal is received by a rear coil of the train ahead to incite automatic acceleration when desired. The front is determined by the operator according to the direction selected for traveling as established through additional contacts operated with the reverse switch or lever.

The signals sent from the front and rear are satisfactorily confined to the rails. Front and rear signals of the same train are kept separate by the shorting of the rails through the wheels and axles of the train. The signals are further limited by rail insulators to prevent control or signaling between trains at a distance not requiring control. The rail insulators are bypassed by the dropping of relays normally held open by a track circuit between each insulated section as the train shorts out the track circuit which holds the respective relays open. Thus the zone or range of the signals follow the train to the extent of the shorted track circuits or preferably, as herein described, to the extent of partially bridged bypasses to the front and rear of the train, which bypasses are closed upon the entrance of a second train across a rail insulator within the zone of control of the first mentioned train. The usual positioning of the track circuit insulators at switches and crossings will confine the signal to the proper route. The front and rear signals are received only by the rail units normally next ahead or behind respectively, since the wheels and axles effectively short the signals from continuing to a train further down the track.

According to a feature of this invention the rail units are permitted to operate only while a clear track indication is received or while train to train control indicates a safe velocity with respect to the train ahead. When the track is clear an alternating or intermittent direct potential is placed on the rails through contacts of track circuit relays upon the entrance of the train into a clear block or clear series of blocks. The resulting signal is inductively received at the front of the train as with coded track circuits. Upon the entrance of another train within the control zone the inductive track current is taken off the rails between trains by the dropping of the track circuit relays as later explained. A velocity indication from the train ahead which is found to be safe compared with the velocity of the receiving train holds in a relay which permits this following train to operate.

This invention is capable of various degrees of application. Not all trains over a given route need to be equipped for train to train control; ordinary signal or automatic control systems suitable to operate from or cooperate with the track circuits provided in this invention can be used; then where speed control between trains scheduled only a few minutes apart is found desirable, those trains can be provided with train to train control.

This invention is suitable for automatically controlling train operation and for various forms of transfer car applications, since upon this invention determining the proper speed the speed can be controlled closely and quickly through the operation of automatic controls described in my above mentioned application, which provides fine speed regulation.

Accompanying drawings illustrate preferred systems and embodiments for communicating speed information between trains and from track to trains. Other systems of coding or synchronizing might be used which come within the intended scope and development of this invention.

Figure 1:
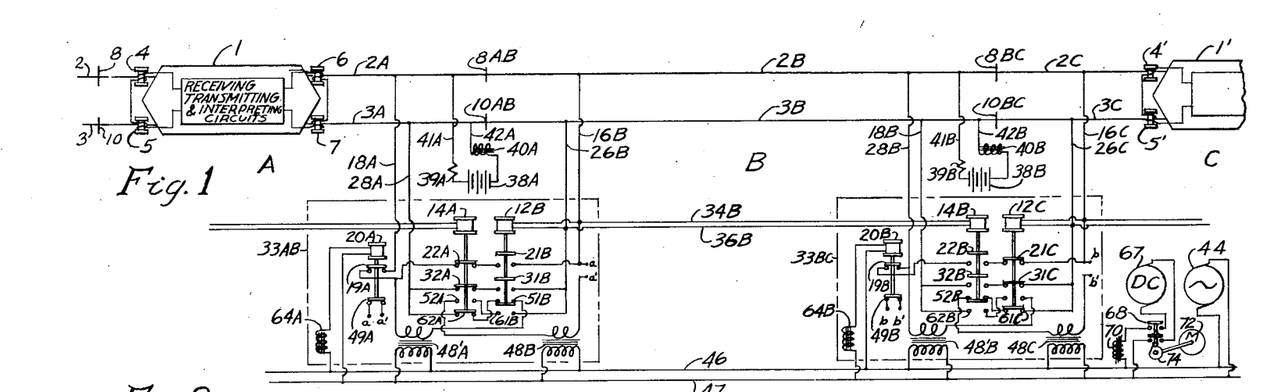
FIGURE 1 is a diagrammatic view of trackway circuits providing a zone of control which varies from one to two blocks between rail units and providing for coding the rails when the track is clear for either direction of traffic. Also shown therein is a train and a portion of another outside the zone of control.

Referring to the drawings and in particular to FIGURE 1, the trackway is divided into track circuit blocks designated A, B, C, etc. for convenience of reference. Numbers representing components of a specific block are followed by the letter designating the block where found. Each block is considered similar to the others. A train 1 on rails 2A and 3A has at one end coils 4 and 5 mounted with inductive relation respectively to rails 2A and 3A and at the other end coils 6 and 7 in inductive relation respectively to rails 2A and 3A. Coils 4 and 5 are connected inductively opposing as shown. Similarly coils 6 and 7 are inductively opposing. When an alternating current is applied to coils 6 and 7 for example an alternating potential is induced in rails 2A and 3A of opposite polarity. Insulators such as 8AB and 10AB etc. are provided between lengths of rail at block intervals to limit the range or zone of this alternating potential. Train 1', a portion of which is shown, is on rails 2C and 3C and has coils 4' and 5' in inductive relation respectively and oppositely to rails 2C and 3C. Rail insulators effectively prevent current around the loop otherwise completed by the two rails and the wheels and axles of the two trains.

The zone of control between trains is assured to be adequate at all times by providing blocks of sufficient length and track-circuit-relay controlled bypasses around each rail insulator to extend and retract the zone of control as the train passes.

Track circuit relays similar to 12B and 14B are provided at opposite ends of each block. Rail insulator 8AB is bypassed from rail 2A by a path comprising in series lead 18A, back contacts 19A on relay 20A, back contacts 22A on relay 14A, back contacts 21B on relay 12B, and lead 16B to rail 2B. Rail insulator 10AB is bypassed from rail 3A by a path comprising in series lead 28A, back contacts 32A on relay 14A, back contacts 31B on relay 12B, and lead 26B to rail 3B. These bypasses around insulators 8AB and 10AB provide a low resistance path for the train to train current loop. The coil of relay 12B is connected across leads 16B and 26B to rails 2B and 3B within a protecting box 33AB. The coil of relay 14B is connected by line wires 34B and 36B also to leads 16B and 26B within box 33AB. The coils of relays 12B and 14B being connected by leads 16B and 26B across the rails at the same end of the block are energized by a track circuit current from battery 38B in series with current limiting resistor 39B and choke coil 40B and connected to the rails at the opposite end of the block by leads 41B and 42B. Choke coil 40B prevents the shorting of AC signal and control current through battery 38B. Full track circuit protection is obtained by this arrangement.

The bypasses around insulators 8AB and 10AB would be closed by the shorting of the track circuits of both blocks A and B. Block B is not bridged to block A or C, because battery 38 holds open relays 12B and 14B thus preventing induction signaling between trains 1 and 1'.

If train 1 moves into block B with train 1' in block C intercontrol can be established, train 1' being from one to two blocks ahead of train 1. Thus the zone of train to train control varies from one to two blocks.

One or more alternators 44, located where desired, are connected across lines 46 and 47 to supply a frequency for clear track coding. Transformer 48B connected across lines 46 and 47 applies this frequency to rails 2B and 3B through a path comprising lead 16B, back contacts 49A on relay 20A, the secondary coil of transformer 48B, front contacts 52A of relay 14A, back contacts 61B of relay 12B, and lead 26B in series. This path is completed by the entrance of train 1' into block B with block A clear. Similarly transformer 48'A connected across lines 46 and 47 applies this frequency to rails 2A and 3A by a path comprising lead 18A, back contacts 19A, the secondary of transformer 48'A, front contacts 51B of relay 12B, back contacts 62A of relay 14A, and lead 28A in series. This path is completed upon the entrance of a train into block A with block B clear. Thus a train from either direction receives a clear track indication throughout each clear block only when the block ahead is also clear.

When a train passes from one block to another, the block cleared remains shorted through the bypasses around the track insulators. Relay 20A is connected in series with choke coil 64A across lines 46 and 47 supplied with direct current for enough time to open relay 20A and break the bypass between adjacent blocks to allow relays 12B and 14A to pickup in the blocks that are cleared. The opening of relay 20A interrupts the track code, so that, if relay 20A does not close, the clear track indication will not be placed on either block from the ends controlled by the open relay 20A. The clear track indication is not placed on the rails from an end of a block which is bridged to the next block, or has any of leads 16B, 18A, 26B, or 28A broken. Relays 12B, 14A, and 20A preferably have mercury contacts. One or more direct current generators 67 in series with cam operated contacts 68 and choke coil 70 across lines 46 and 47 supply the intermittent current of the required duration. Motor 72 drives cam 74 at a suitable speed.

The frequency of the clear track signal can equal the frequency transmitted by a train traveling away at any desired speed. Therefore a clear track signal of proper frequency can be used to limit the speed of trains around curves etc. and the clear track signals in successive blocks or the train to train signals herein to be described can limit train speed for the entire run of the train. The controls of the train can be turned on for automatic operation over trackage having the speed limiting clear track signals.

Figure 2:
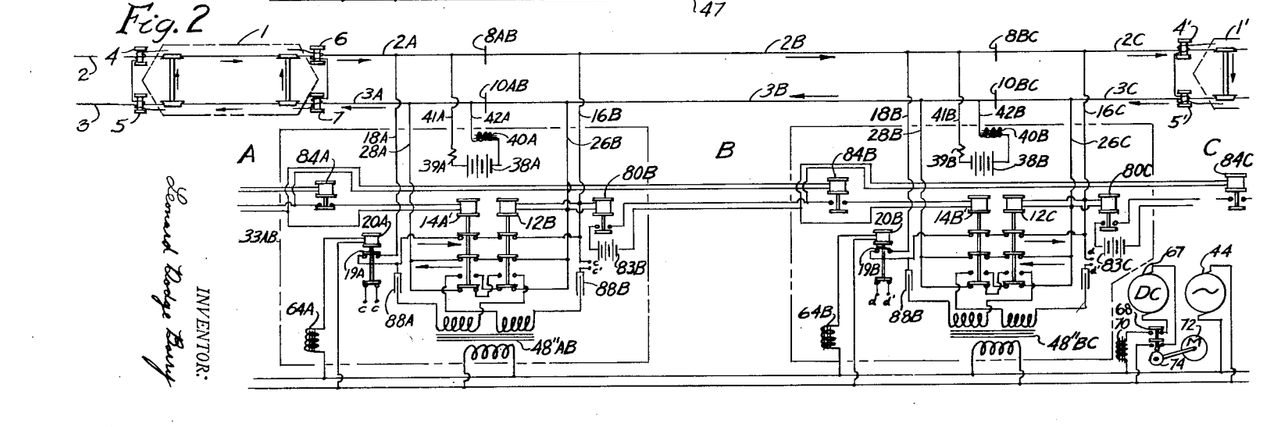
FIGURE 2 is similar to FIGURE 1 except the circuits provide a zone of control which varies from two to three blocks, and the trains shown are now within the zone of control communication with each other.

The circuits of FIGURE 2 are basically the same as those of FIGURE 1 with the addition of relays and leads to extend the zone of control to vary from two to three blocks between trains. Relay 80B is added in parallel to relay 12B across leads 16B and 26B. Relay 80B has front contacts in series with battery 83B to connect in relay 14B' in series with front contacts on relay 84B and to connect in relay 84C in parallel with relay 14B' and the contacts of relay 84B. Relay 80B is closed by the track circuit of block B through leads 16B and 26B. Relay 84B is closed by the track circuit of block A. Upon the shorting of block A by train or otherwise relays 14A' and 84B drop. Relay 84B opens the circuit through battery 83B to relay 14B' dropping relay 14B'. The presence of a train in block C drops relay 12C and block B is bridged to block C shorting block B which drops relay 12B and bridges block A to block B. Thus the circuits of FIGURE 2 provide a zone of control which varies from two to three blocks between trains.

By additional relays and lines similar as described for FIGURE 2 the zone of control can be made to vary from three to four, four to five, etc. blocks between trains.

The purpose for varying the zone of control slightly as between six and seven blocks is evident where transfer car service is to be employed. With through-train transfer-car service with the zone varied from one to two blocks and fixed starting points for locals to be joined to the train not properly planned with respect to the blocks the local may be accelerated two blocks in advance instead of one block ahead of the train for a minimum run before coupling. With the variation of control small, six to seven block zones, the time and distance to couple will approach the minimum for a given train speed and for given characteristics of the car to be coupled.

FIGURE 2 shows transformer 48"AB substituted for transformer 48B and 48'A. Condensers 88A and 88B are added in series with the transformer 48"AB secondary coils to keep out direct current of the track circuit. The condensers might also be used to series tune the track code circuit but are optional.

The trains 1 and 1' as shown in FIGURE 2 are in rail communication. The alternating induction current between trains at a given instant is indicated by arrows. The wheels and axles are shown completing the current link between trains.

Figures 3, 4, 5:
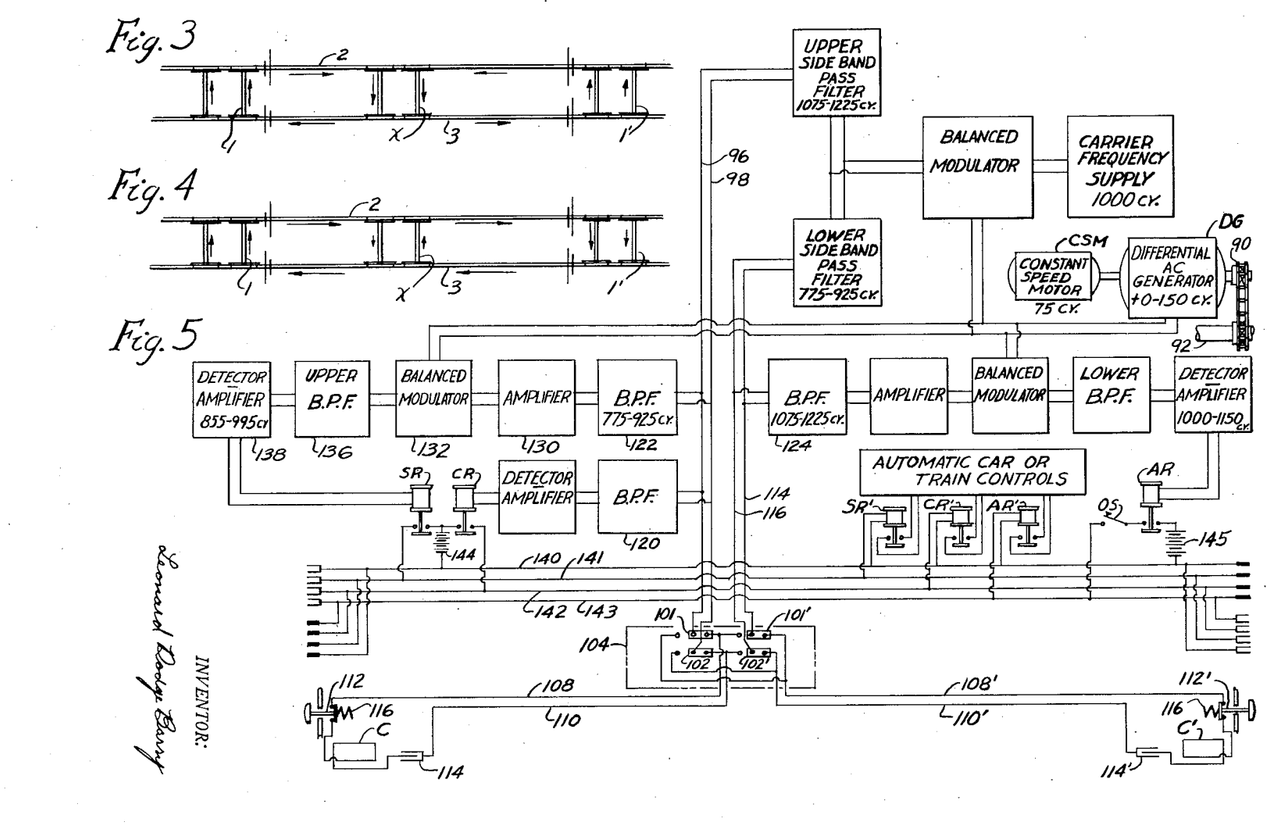
FIGURES 3 and 4 are diagrams of simplified equivalent circuits to illustrate instantaneous track communication currents taken at different instants.
FIGURE 5 is a schematic view of the circuits for transmitting, receiving, and interpreting speed indications typical for a multiple-unit car.

Referring next to FIGURES 3 and 4, the rail currents are shown at different phase positions with cars or trains 1, 1', and X in a common zone of control and each represented by a double pair of wheels and axles. The induced potential of the coils of cars 1 and 1' is represented by battery symbols to show the instantaneous polarity. The object is to show that the signal sent from car 1 is not received by car 1'; for if it were, car X, which is considered not transmitting, would not be detected. Car X having standard steel wheels and trucks effectively shorts any signal between cars 1 and 1'.

FIGURE 3 shows cars 1 and 1' transmitting at an instant their induced voltages are out of phase. If car X were omitted the currents would neutralize, since the current between trains 1 and 1' would vary with the frequencies of both trains' transmitters. With car X in place, the currents from trains 1 and 1' are shorted without effectively mixing.

FIGURE 4 shows cars 1 and 1' transmitting at an instant the induced voltages are in phase. Without car X the induced voltages aid to produce a current equal to the sum of the voltages divided by the resistance of the loop. With car X the currents from trains 1 and 1' effectively neutralize any difference of potential through the axles of car X.

Thus, though large track currents flow with conditions as in FIGURES 3 and 4, a frequency or code sent from train 1 is not received by train 1' and vice versa. The worst condition that might exist is where trains 1 and 1' are close to a single car X, but the proportion of current from train 1 which reaches train 1' will be less than 50% of the total because of rail resistance, assuming car X is in good contact with the rails. The receivers of trains 1 and 1' can be set to receive a signal above a minimum level and the power of the transmitters regulated so that a signal received at half volume need not be used; or the occurence of three rail units in one zone of control can be prevented by proper scheduling.

*Railway Vehicle Circuits*

Figure 11:
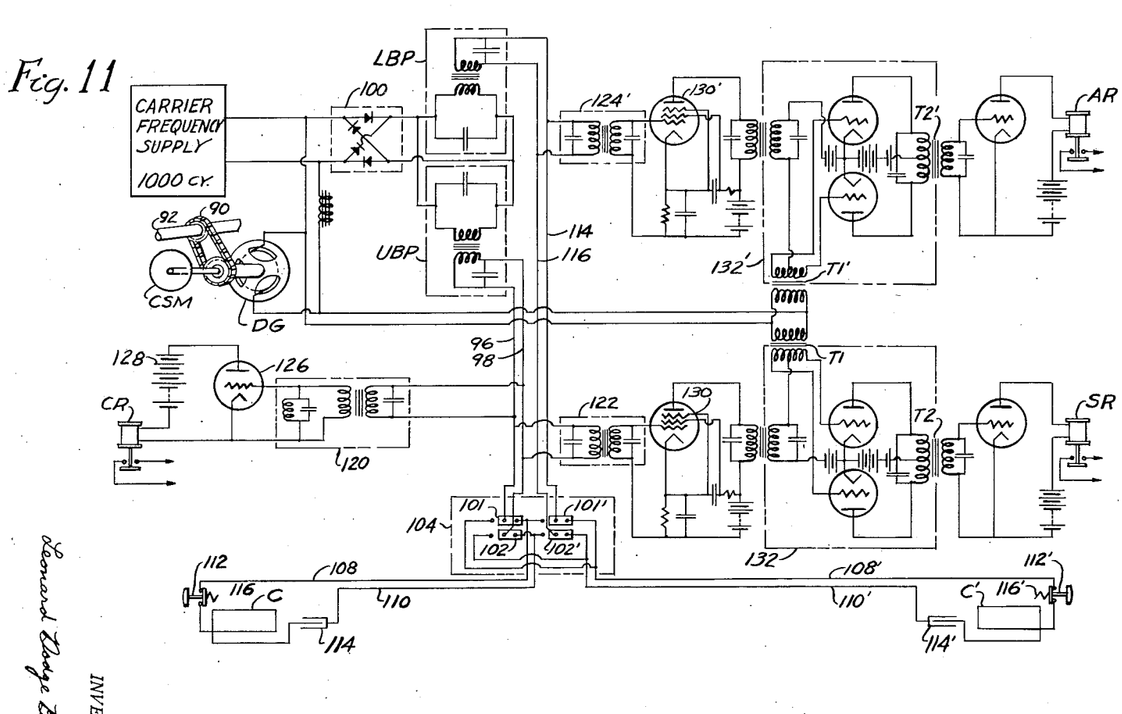
FIGURE 11 is a diagram of the vehicle circuits for general application, showing details of components.

Referring to FIGURES 5 and 11, a fixed carrier frequency is available on all rail vehicles or trains for transmitting purposes and is designated carrier frequency supply. This frequency is within close limits the same for all train to train transmitters in a given installation and should be standardized. This frequency can be supplied by any suitable means such as individual frequency generators or might be supplied with or without conversion from line wires or point locations by radio, the rails by induction, or a power line by contact.

Figure 15:
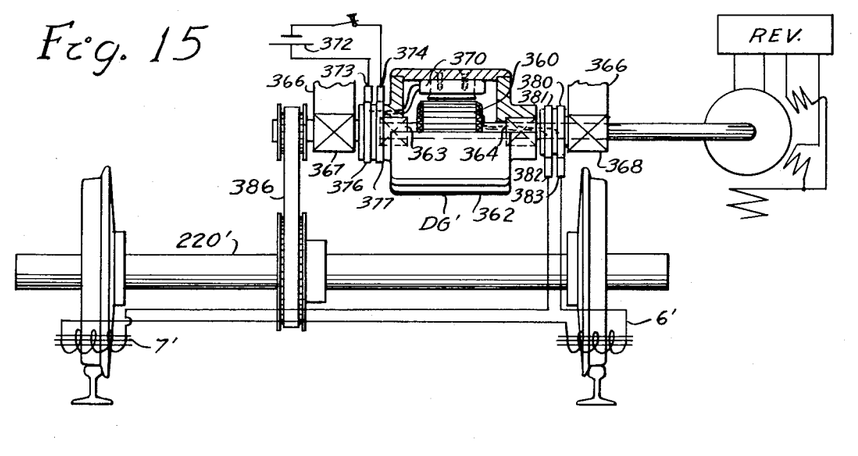
FIGURE 15 is a schematic of a differential-generator transmitter.

A second fixed frequency is supplied by any suitable means such as the differential generator DG shown in FIGURES 5, 11, and 15. In FIGURES 5 and 11 the armature of this generator is driven at a fixed speed by means of synchronous or constant speed motor CSM connected by the car controller through additional reversing contacts on the car motor reversing switch similarly as for traction motors. This frequency is called a band separating frequency.

The field of the differential generator is revolved in bearings around the armature at a speed proportional to car speed oppositely to the rotation supplied to the armature by motor CSM to increase the frequency of generator DG above the fixed frequency by an amount proportional to car speed. The field of generator DG is rotated by chain drive 90 from axle 92, or other nonslip drives could be used.

The frequency supplied by the differential generator DG is combined with the carrier frequency in a balanced modulator so to produce the sum and difference frequencies. Side-band pass filter circuits separate the upper and lower band frequencies. These bands will clear each other at zero car speed by twice the band separating frequency. At higher speeds the frequencies within the different bands will be farther apart.

The upper band pass UBP is connected by leads 96 and 98 to contacts 101 and 102 on reversing switch 104 and from this switch, in the position shown, by leads 108 and 110 to coil C (now at the front) in series with normally closed coupling switch 112 and condenser 114. The coupling switch 112 opens the circuit through coil C when between coupled cars. Switch 112 is closed by spring 116 when the end of the car on which it is located is uncoupled.

The lower band pass is connected by leads 114 and 116 to contacts 101' and 102' on reverse switch 104 and in series by leads 108' and 110' to coil C' at the rear of the car in series with normally closed coupling switch 112' and condenser 114'. Condensers 114 and 114' are included as an aid to tune the circuits, but can be omitted, since the band pass filters are tuned.

The signals to be received are namely: the clear track signal or track code and the rear signal, both received at the front only, and where used, the front signal received at the rear only, and synchronizing or basic frequencies might be received at either end.

The receiving circuits for the track code and rear signals are connected by appropriate band pass filters B.P.F. 120 and 122 respectively and in parallel across lines 96 and 98 to use the same line reverse switch contacts 101 and 102, coil C, and coupling switch 112 through which the upper side band is transmitted.

The receiving circuits for the front signal are connected by band pass filters B.P.F. 124 in parallel across lines 114 and 116 to use the same line reverse switch contacts 101' and 102', coil C', and coupling switch 112' through which the lower band is transmitted.

The track code signal receiver is provided with a vacuum tube detecting amplifier 126 with its plate circuit in series with battery 128 and a sensitive plate relay CR.

The receiver connected to pick up signals at the front of the vehicle which have been transmitted from the rear of a forward vehicle comprises in order from the pickup coil, band pass filter 122, an amplifier 130, a balanced modulator 132 which combines the frequency of the differential generator DG with the incoming signal producing side bands, an upper band pass filter 136, a detecting amplifier 138, and a sensitive plate circuit relay SR. The frequencies passed in the various stages are discussed later using a general example.

The rear receiver for the front signal performs the same function as the front receiver for the rear signal, and the components are considered similar except for tuning and numbered the same with a prime added except for the sensitive plate relay which is designated AR.

Relays SR, CR, and AR have front contacts which are closed by the currents passed to and detected and amplified in the last stages of their respective receivers. Relay CR should be slow to open so as to allow time for relay SR to close. The closing of relay AR permits automatic acceleration depending on the closing of operator's switch OS in series therewith.

Train lines 140, 141, 142, and 143 are furnished in the multiple-unit car shown in FIGURE 5. Battery 144 is connected across line 140 through contacts of relay SR to line 141 and through contacts of relay CR to line 142, and battery 145 is connected across line 140 through the contacts of relay AR and switch OS to line 143 as shown. Relays SR', CR', and AR' are connected across train lines 141, 142, and 143 respectively to line 140 and operate in all cars together but only need to connect in automatic controls on the first car. By this arrangement the interpretations of the signals are sent throughout the train for use at either end.

The components represented by rectangles in FIGURE 5 are shown in FIGURE 11 by typical common circuits for the various functions mentioned using appropriate electrical symbols. Therefore the suggested circuit details of FIGURE 11 should be understood without further reference.

Figure 6:
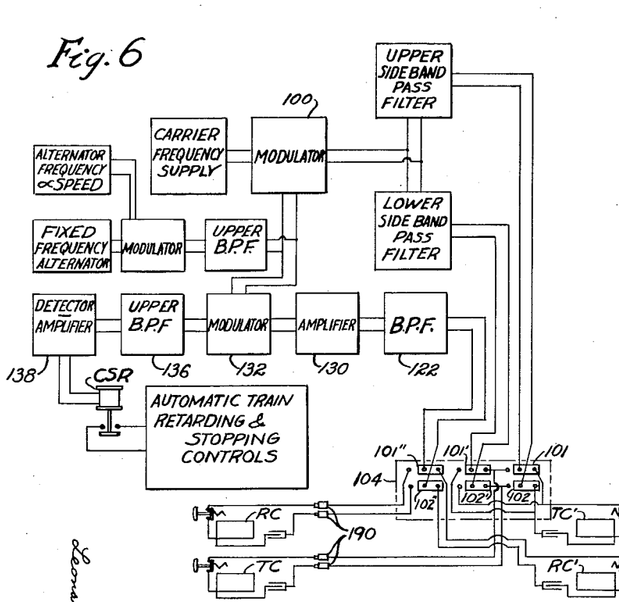
FIGURE 6 is a schematic view of the circuits as applied to a locomotive.

Circuits for a locomotive are shown in FIGURE 6 with components which carry out the same operation as in the multiple-unit car similarly labeled. The rear receiver for the front signal is omitted, since the train is not required to accelerate automatically. The train line is omitted as a means for transmitting automatic control for the same reason. The remaining circuits are in general similar to those on the multiple-unit car except for the following variations, which could be applied generally.

The differential generator DG and constant speed motor CSM are replaced with a fixed frequency alternator, an alternator with frequency proportional to locomotive speed, a balanced modulator to combine the two frequencies producing upper and lower bands, and a band pass filter B.P.F. to pass only the upper band. These components are appropriately labeled and connected as shown.

The clear track signal is made the same as the signal received from a train traveling away from the receiving train at any desired maximum speed for the receiving train and can therefore be received by the train to train receiving circuit, eliminating the need for a separate clear track receiving circuit on the train.

The transmitting and receiving coils are shown separate and are located over the rails at diametrically opposite corners of the locomotive combination.

The function of the various component groups as applied to locomotives are; the receiver to check the speed and track conditions; the transmitter lower band pass to indicate speed to following trains when the locomotive combination constitutes the train or where train lines are used to carry the signal to the rear; the transmitter upper band pass to indicate on a forward train the approach of the locomotive. These features can be individually applied.

Couplers 190 to the tender or second section of the locomotive are provided. The reverse switch 104 has additional contacts 101" and 102" for connecting separate receiving and transmitting circuits respectively to coils RC and TC.

Figure 7:
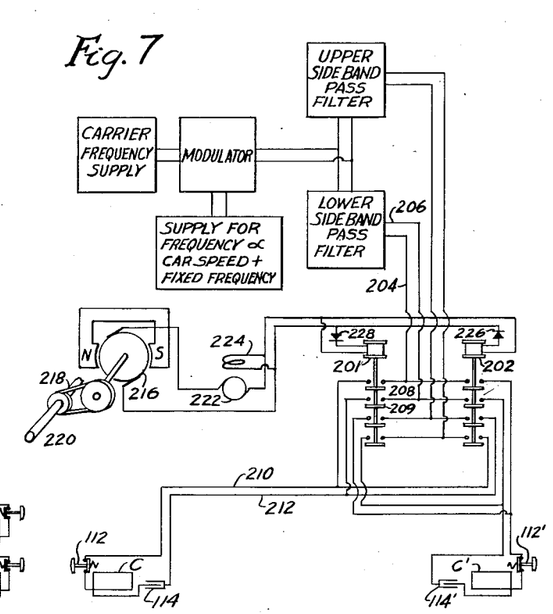
FIGURE 7 is a schematic view of the circuits on a caboose.

Circuits for transmitting speed communication from a caboose or rear car are shown in FIGURE 7. Receivers as provided on the multiple-unit car could be used to indicate the approach of a train and could be sent by train line or radio code to the front of the train if desired, but a rear car having the transmitter is sufficiently equipped for a train having train to train control to follow at a safe speed.

Relays 201 and 202 serve as the reverse switch. The lower band pass is connected by leads 204 and 206 to front contacts 208 and 209 on relay 201 and from contact 208 through line 210, coupling switch 112, coil C, condenser 114, line 212 to relay contacts 209. The lower band is likewise connected in parallel through front contacts of relay 202 and coil C' in series. The upper band pass is oppositely connected to coils C and C' through similar contacts on relays 202 and 201 respectively. Relay 202 is energized when the car is moving from right to left at a sufficient speed to energize the coil of relay 202 through the circuit established by a permanent field direct current generator 216 driven by belt drive 218 from the car axle 220 a direct current counter-electromotive-force motor armature 222 having a shunt field 224 connected to oppose voltage generated by 216 from building up too high at high speed, rectifier 226, and the coil of relay 202. The coil of relay 201 is connected in series with rectifier 228, and both are in parallel with relay 202 and rectifier 226. Rectifiers 226 and 228 are oppositely connected. Thus either relay 201 or 202 is operated according to the direction of travel. Similarly the upper side band pass is connected to other contacts on both relays so as to be connected to the coil at either end of the car oppositely to the lower side band as shown.

Figure 8:
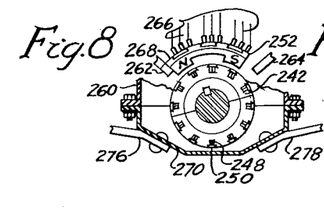
FIGURE 8 is a cutaway and sectional view of an eddy current reverse switch as suitable for mounting on the axle of a caboose.
Figure 9:
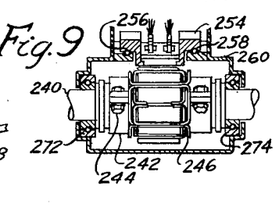
FIGURE 9 is a cutaway and sectional view taken vertically lengthwise through the switch shown in FIGURE 8.

The reverse switch shown in FIGURES 8 and 9 is an alternative for relays 201 and 202 and the circuits just described for their operation. This switch is designed for mounting on a car axle 240 and has a split armature 242 the two halves of which are bolted together with bolts 244. Copper loop coils 246 are inserted in slots 248 on the armature and held in place by wedges 250. A permanent magnet 252 having poles N and S spaced equal to the radial spacing of opposite loop sides so that the voltage adds in opposite loop sides under opposite poles. The resulting current exerts a force on the magnet in the direction of rotation of the armature. The magnet is supported on an arc centered with axle 240 by curved member 254 having ball bearing raceways 256 and 258 supported on upper enclosure member 260. Movement of the magnet is limited by stops 262 and 264. Contacts 266, considered as a group, engage against the required arrangement of insulation and conducting surface 268 mounted on and insulated from the outer circumferential surface of the magnet. A lower enclosure member 270 bolts to the upper 260 and retains split bearings 272 and 274, which center the enclosure with respect to the axle. Torque arms 276 and 278 prevent the enclosure from revolving. When the car is in motion the magnet is moved to either stop according to the direction of car movement, thus providing a reversing switch.

Figure 10:
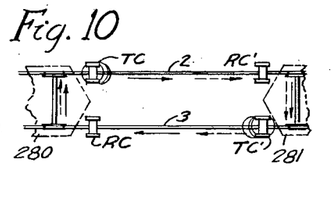
FIGURE 10 is a diagram of the preferred arrangement of transmitting and receiving coils when separate coils are used.

FIGURE 10 is included to illustrate the rail loop current and coil arrangement between trains having separate transmitting and receiving coils as provided on the locomotive combination shown in FIGURE 6. Trains 280 and 281 on rails 2 and 3 have transmitting coils TC and TC' respectively and receiving coils RC and RC'. Coils TC and RC' are mounted over rail 2, and coils RC and TC' are mounted over rail 3. The current loop at a given instant is represented by arrows.

The function of circuits shown in FIGURES 5, 6, 7, and 11 can best be illustrated by an example using specific frequencies. The frequencies of the following example are shown on FIGURE 5 associated with the components where found. A carrier frequency of 1000 cycles is selected. A band for speed variation from 0 to 150 cycles is selected and requires a minimum band separating frequency of 75 cycles as will be shown. The band separating frequency is modulated or combined by differential generator with the frequency proportional to speed and the upper band or sum frequency is passed. The band for the speed variation is as thereby shifted 75 to 225 cycles for all transmitters. A frequency in this band is modulated with the carrier in a balanced modulator, and the resulting sum and difference frequencies are separated by upper and lower band passes. The upper band pass will transmit 1075 to 1225 cycles and the lower band pass 775 to 925 cycles. The upper band being selected for transmission from the front and the lower from the rear. The front coil receiver is tuned for 775 to 925 cycles, the rear for 1075 to 1225 cycles. Each receiver simplifies a signal within its tuned band and modulates it with the shifted speed frequency of the car. Thus the front coil receiver modulates a signal in the band 775 to 925 cycles with 75 to 225 cycles according to car speed. The important bands of frequency resulting from this modulation are the sum 850 to 1150 and the difference 550 to 850, of which 550 to 855 and 995 to 1150 is filtered out. The band between 855 and 995, having 5 cycles allowed for overlap of unwanted bands, indicates that your train is traveling at a slower speed than the train ahead. A frequency in the band 855 to 995 is separated by filters or tuned circuits and amplified and detected to energize relay SR which then closes and permits the train to operate. The rear coil receiver modulates a signal in the band 1075 to 1225 cycles with 75 to 225 cycles according to car speed. The bands of frequency to be considered resulting from this modulation are the sum 1150 to 1450 and the difference 850 to 1150, of which 1000 cycles (plus or minus a few cycles according to the speed difference desired between trains) to 1150 cycles is passed, the other frequencies being filtered out. The frequency passed is amplified and detected to energize relay AR which closes and accelerates the train in series with switch OS and in parallel with the operator's controls and dependent on relay SR or CR being closed.

Figure 12:
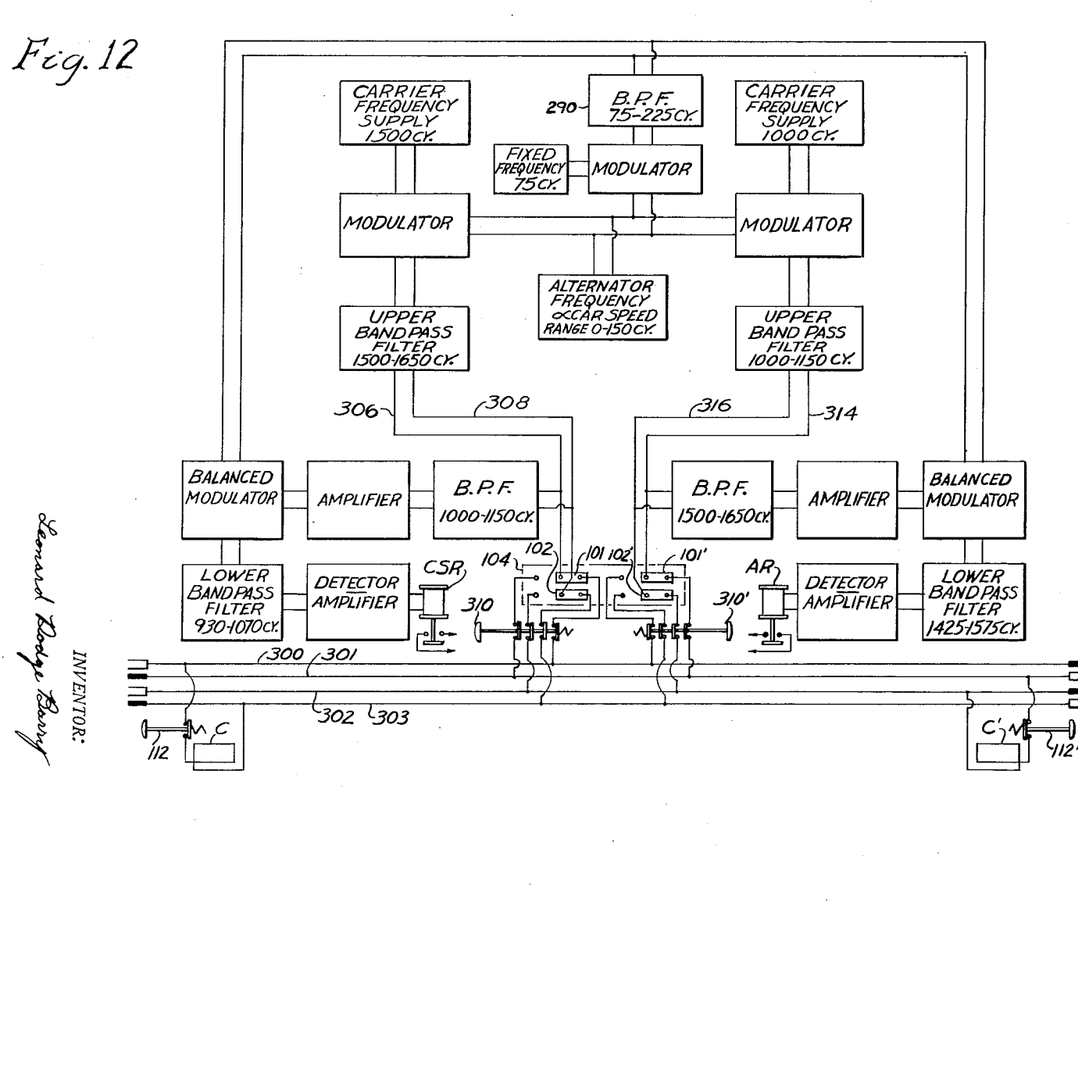
FIGURE 12 is a schematic view of a variation of the vehicle circuits.

One of several alternative methods for relating speed difference between trains is shown in FIGURE 12. This method differs only slightly from the system described and illustrated as applied to a multiple-unit car.

Two carrier frequencies are supplied on each transmitting car. Each carrier frequency is separately modulated with a frequency preferably proportional to car speed. The upper side bands resulting from the modulations are separated from other frequencies by band pass filters and are transmitted from opposite ends of the train. The receiving circuits are in general the same as with the other method. The frequency proportional to car speed is modulated by a fixed frequency and filtered by band pass filter 290 for application at the receiving modulators.

A general feature shown in FIGURE 12 is the application of train lines for transmitting and receiving signals from the rear of the train. Train lines 300, 301, 302, and 303 run the length of the car and have alternately and oppositely arranged male and female coupler fittings as shown. Transmitting-receiving coil C, in series with coupling switch 112, is connected across lines 300 and 303 at one end of the car. Similarly coil C' in series with coupling switch 112' is connected across lines 301 and 302 at the other end. Leads 306 and 308 are connected to contacts 101 and 102 on reverse switch 104; in the switch position shown, from there to lines 300 and 303 in series with contacts on coupling switch 310; and in the reverse switch position from contact lines 301 and 302 in series with other contacts on coupling switch 310. Likewise leads 314 and 316 are connected to contacts 101' and 102' on the reverse switch; in the switch position shown, from there to lines 301 and 302 in series with contacts on coupling switch 310; and in the reverse position, from the contacts to lines 300 and 303 in series with other contacts on coupling switch 310'. The transmitter-receiver leads are thus connected to the train lines through the normally closed coupler switches only at the ends of the train, and only one front and one rear transmitter is connected to their respective lines selected through the reverse switch according to the direction of travel.

An example of the frequency associated with different components is shown therewith on FIGURE 12. Selecting carrier frequencies of 1000 and 1500 cycles and an alternator having a frequency band for speed variation from 0 to 150 cycles the balanced modulation of each carrier separately with the frequency proportional to car speed produces upper side bands of 1000 to 1150 cycles and 1500 to 1650 cycles and lower side bands of 850 to 1000 cycles and 1350 to 1500 cycles. The upper side bands are selected to be transmitted and are filtered from other frequencies and separately transmitted at opposite ends of the train as shown. The receiving circuits connected in parallel across the transmitter leads receive frequencies from incoming signals in the opposite band from that being transmitted over the same leads. Thus the 1000 to 1150 cycle transmitter has in parallel a 1500 to 1650 cycle receiver B.P.F., and the 1500 to 1650 cycle transmitter has in parallel a 1000 to 1150 cycle receiver B.P.F. With this system the two bands are conveniently far apart and are independent of a band separator as used with the first method described. The balanced modulators of the receivers are supplied with 75 to 225 cycles by modulating the 0 to 150 cycle band with 75 cycles and filtering. When the 1000 to 1150 cycle band received at the front is modulated with 75 to 225 cycles the sum 1075 to 1375 and the difference 775 to 1075 are produced, of which 930 to 1070 cycles are passed, amplified, and rectified to energize relay CSR and permit the train to operate. When the 1500 to 1650 cycle band received at the rear is modulated with 75 to 225 cycles the sum 1575 to 1875 and the difference 1275 to 1575 are produced, of which 1425 to 1575 cycles are passed, amplified and detected to energize relay AR for automatic acceleration when desired.

In both systems thus far described the received signal is not passed by the balanced modulator. The signal is symmetrically applied to the center taps of the input and output transformers T1 and T2 respectively as shown in FIGURE 11, thus canceling out in the primary of the output transformer T2. If the frequency representing car speed is not modulated with the incoming signal no signal is passed to the detecting amplifier; the incoming signal being balanced out, and the frequency representing car speed being easily filtered out.

If the band separating frequency is increased to 150 cycles the frequencies to be detected and amplified in the last stages of the receivers would be either below or above the received frequency bands; then any suitable type of modulator could be used and the received frequency filtered out in the upper or lower band pass filter stage.

The band of frequencies passed in the last stage could be divided between several detecting amplifiers and relays by additional filters to indicate ranges of speed difference between trains according to which relay is operated. The relays can operate cab signals as well as train controls.

To enable a train of this system to approach another to couple it at a safe speed difference the output signal band pass 136 on modulator 132, FIGURE 11, is tuned within safety stops or limits ST to shift the passed frequency to include the frequency range representing the train's approach to one ahead at a safe speed difference. This tuning can be ganged and controlled by the operator.

When operating a train automatically on clear track signals which represent maximum speed for trains it may be desired to operate a heavy freight for example at a lower speed than the maximum. Accordingly band pass filter 136 is again tuned (within limits) to limit the frequency passed to that representing the correct speed for the train. As an alternative the frequency of the clear track signal can be altered by driving generator 44 supplying the block or blocks wherein the train is located at a slower speed or if an electronic generator is used by tuning it to oscillate at a lower frequency. The clear track signal can also be shifted according to weather and track conditions.

Figure 13:
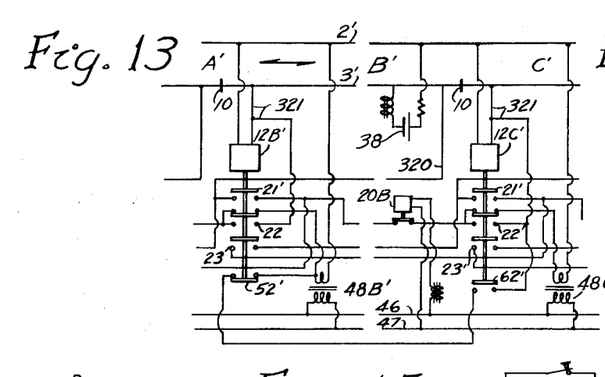
FIGURES 13 and 14 are diagrams of some variations of the block bridging circuits.
Figure 14:
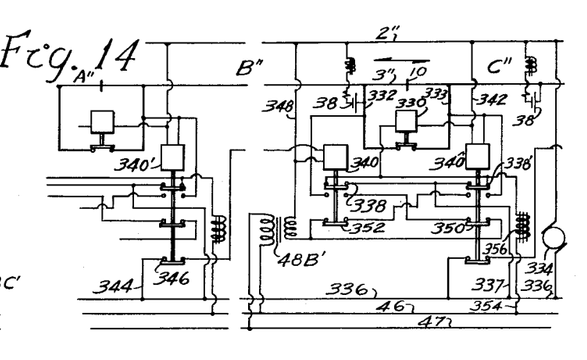

FIGURES 13 and 14 are added to illustrate two of the many other variations of trackway circuits for bridging and coding blocks. With these circuits the number of track circuit relays is reduced from two in FIGURES 1 and 2 to one. The bridge between adjacent blocks of FIGURE 13 is completed in series through contacts on relays in each of a plurality of adjacent blocks, while in FIGURE 14 it is completed by one relay controlled in parallel by track circuit relays in the two adjacent blocks bridged thereby.

Referring to FIGURE 13, the trackway having rails 2′ and 3′ is divided into single-rail blocks (for sake of simplicity of illustration) A′, B′, C′, etc. by insulators 10 in rail 3′. Track circuit bridging relays 12B′ and 12C′ whose coils are connected across rails 2′ and 3′ in respectively blocks B′ and C′ are energized from the track circuit supply 38 connected across the rails of their respective blocks in the usual manner. Blocks B′ and C′ are bridged from rail 3′ block B′ by line 320, back contacts 21′ of relay 12B′, back contacts of relay 20B′, back contacts 22′ of relay 12C′, and line 321 all in series to rail 3′ block C′. This provides that one to two blocks separate trains when the loop circuit between trains is established. Back contacts 23′ on relay 12B′ are connected in parallel with contacts 21′ on relay 12C′ to extend the zone of control another block. Back contacts on adjoining and successive blocks to the left can be added in parallel to contacts 21′ to extend the loop further. Lines 46 and 47 again supply direct current to interrupting relay 20B connected across these lines and supply alternating current for clear track coding to the primaries of transformers 48B′, etc., connected thereacross. The secondary of transformer 48C′ is connected across rails 2′ and 3′ block B′ through front contacts of relay 12C′, back contacts of relay 20B, back contacts 21′ of relay 12B′, and line 320 to rail 3′ block B′ to clear code the track ahead of trains entering block B′ from the left. The secondary of transformer 48B′ (in addition to a similar connection as described for transformer 48C′ made through 48B′ across rails of block A′) is connected across rails 2′ and 3′ block C′ through front contacts 52′ on relay 12B′, back contacts 62′ on relay 12C′, and line 321 to rail 3′ block C′ in series to clear code the track ahead of trains entering block C′ from the right.

Referring to FIGURE 14, the trackway having rails 2″ and 3″ is divided into single-rail blocks A″, B″, C″, etc. by insulators 10 in rail 3″. Back contacts of a block bridging relay 330 are connected across insulator 10 between blocks B″ and C″ as typical by leads 332 and 333 respectively from blocks B″ and C″. Relay 330 is energized by a circuit comprising from rail 2″, power supply 334, line 336 run parallel the trackway, line 337, front contacts 338 and 338′ of relay 340 and 340′ respectively in parallel, coil of relay 330, line 342 to rail 2″. Relay 340 of block B″ is energized by the circuit from line 336 comprising line 344, front contacts 346 of relay 340′ of block B″, coil of relay 340 block B″, and line 348 to return rail 2″. Front contacts of relays 340′ of successive preceeding blocks can be added in series on line 344 to extend the zone of control the desired number of blocks. Relay 340′ of block C″ is connected across rails 2″ and 3″ via lead 333 in block C″ to be energized by track circuit supply 38 for block C″. The clear track code supplied to the primary of transformer 48B″ connected across lines 46 and 47 is supplied across rails 2″ and 3″ block B″ for traffic from the left by the circuit comprising line 348 from rail 2″, secondary of transformer 48B″, front contacts 350 of relay 340′ block C″, back contacts of relay 340 block B″, lead 332 to rail 3″ block B″, and is supplied across rails 2″ and 3″ in block C″ for traffic from the right by the circuit comprising line 348 from rail 2″, secondary of transformer 48B″, front contacts 352 of relay 340 block B″, back contacts of relay 340′ block C″, lead 333 to rail 3″ block C″. The bridge is interrupted by energizing relay 330 occasionally with direct current supplied by generator 67 and accompanying means shown in FIGURE 1 or other suitable means to be connected across rail 2″ and line 46. Relay 330 is connected from line 46 by line 354, choke coil 356, coil of relay 330, to rail 2″.

The operation and function of the circuits of FIGURES 13 and 14 are similar to those of FIGURES 1 and 2. FIGURE 14 is preferred over FIGURES 1, 2, and 13 in that the bridge leads are reduced to a minimum and the circuit simplified.

As shown by FIGURE 15, my differential generator can be used to supply the transmitted frequency directly at high power. The armature 360 is supported in the field housing 362 by bearings 363 and 364. This generator DG′ is supported to truck frame 366 in bearings 367 and 368. Bearing 367 is on a shaft secured to and extending from the left hand end of the field housing. Bearing 368 is on the armature's shaft extending from the right of the housing. The field can be of the permanent-magnet type for close spacing of the field poles or wound with coils 370 energized by direct current source 372 connected across brushes 373 and 374 which engage slip rings 376 and 377 respectively and across which rings the field coils are connected in series or parallel. The output of the armature wound in a usual manner is connected across slip rings 380 and 381 and passed through transmitting coils 6′ and 7′ connected in series or parallel across brushes 382 and 383 respectively engaging slip rings 380 and 381. The armature 360 is connected to and driven by a high-speed reversible synchronous motor SM preferably. Reverse switch means REV are provided to reverse the motor with reversal of direction of vehicle operation. The field 362 is driven through timing belt and pulleys 386 from axle 220′ of truck 366 preferably in the opposite direction of rotation from motor SM to provide a transmitted frequency equal to the sum of the revolutions per second of the armature and field times half the number of field poles. If motor SM developes 3600 revolutions per minute and is direct coupled to generator DG′ which say for example and not as a limitation has twenty field poles the output frequency is 6000 cycles per second at zero train speed. This frequency with that representing the train's speed added is transmitted from coils 6′ and 7′ and received by say a following train and modulated with a frequency representing its speed such that the resulting difference or sum is determinate of a safe or unsafe speed difference or of a particular speed difference between trains.

To determine the relations of the frequency representing the speed of for example a forward vehicle and called the "transmitted" frequency T and the frequency representing the speed of a receiving vehicle called the "receiving" frequency R to be combined with the "transmitted" frequency to obtain an output frequency band determinate of either a safe or an unsafe condition calculations are best shown graphically.

FIGURES 16–23 illustrate T and R graphically as frequency vs. speed for each of the two trains to be compared. The sum and difference frequencies when both R and T are at the same speed (representing the border between safe and unsafe conditions) are plotted as dashed lines and labeled Sum and Diff. In FIGURES 16–19 the Sum is off the graph and has an undesired slope. FIGURES 20–23 illustrate lower frequency such that both the Sum and Diff. can be shown on the same graph. The area shaded sloping upward to the right represents the rearward train traveling at the same or a lower speed than the forward, and is the safe area when T is in front of R. Since the output is only a frequency, the speed of the forward vehicle not being known in the modulated output frequency, the useful portion of the safe area is limited to frequencies which represent only safe conditions, ie. the area bounded by vertical lines completely within the safe area, and this portion is labeled Use to indicate this as the frequency range to which filter 136 would usually be tuned if the frequencies shown on the same graph are used but may be shifted to permit trains to couple.

Figure 16:
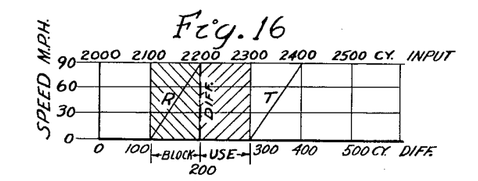
FIGURES 16-23 are graphs of frequency vs. speed to illustrate what frequencies provide a useful output signal for various input frequencies.

FIGURE 16 shows R and T increasing directly with speed. The frequency increases proportional to a ratio wherein speed is in the numerator and vice versa. The safe portion of the difference area has vertical side boundries enabling the full area to be used and all frequencies therein passed.

Figure 17:
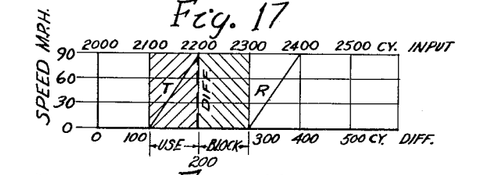

FIGURE 17 has the frequency bands of R and T reversed. The difference useable includes the transmitted frequency, which is undesired for reasons given.

Figure 18:
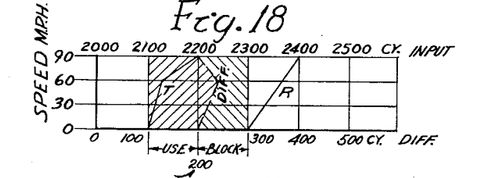

FIGURE 18 illustrates a transmitted frequency which increases its rate of increase of frequency with speed at 60 miles per hour as an example to illustrate calculation and results. The side of the unsafe area is dented with safe conditions, but only the portion of the safe area labeled Use can be used by the receiver unless a further check of the speeds is made.

Figure 19:
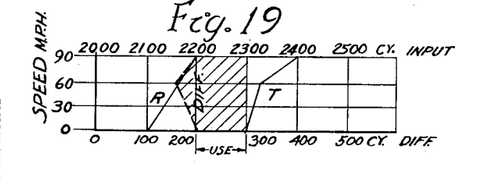

FIGURE 19 illustrates the results of switching R and T of FIGURE 18. The safe area is extended outward irregularly again making it difficult to utilize the full area.

Figure 20:
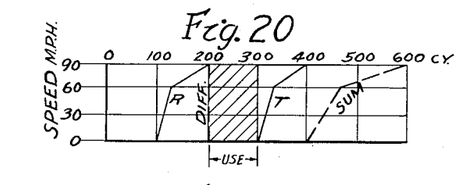

FIGURE 20 illustrates both R and T increasing similarly with speed but changing the rate of increase above 60 miles per hour. The difference is seen to be useable, but the sum as in the examples illustrated by FIGURES 16–19 has such a slope as to be impractical of solution with simpler means available.

Figure 21:
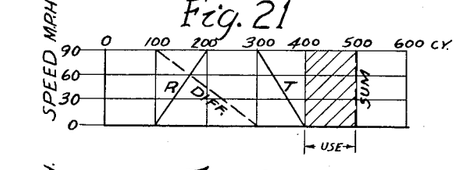

FIGURE 21 illustrates R increasing and T decreasing linearly with increase of speed. The half of the sum shaded is useable. The frequency transmitted varies inversely as the speed; that is, the frequency varies proportional to a ratio wherein the speed is in the denominator and vice versa.

Figure 22:
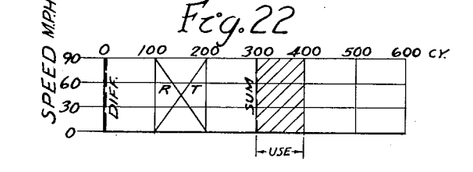

FIGURE 22 illustrates both R and T in the same frequency band and T increasing while R decreases linearly with speed increase. The shaded half of the sum band is useful.

Figure 23:
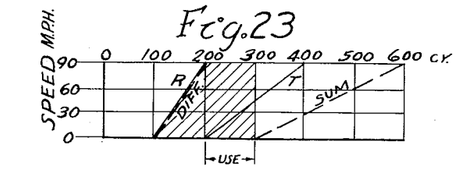

FIGURE 23 illustrates T and R having different slopes. The results are difficult to use.

To illustrate the use of FIGURES 16–23 with FIGURE 16; when the transmitting train T is traveling at 30 m.p.h. and R is following at 60 m.p.h. the frequency as found on FIGURE 16 for T is 2333 cy. modulated with 2167 cy. by R giving a difference of 166 cy., which is represented on the chart between 2100 and 2200 (omitting the highest digit), which is within the area labeled "Block" indication an unsafe condition. If train T speeds up to 45 m.p.h. and train R slows down to 30 m.p.h. the frequency for T is 2350 and for R is 2130 giving a difference of 220 cy. which is within the area labeled "Use" indicating a safe condition.

The difference in results between transmitting to a rearward train and to a forward train is that the safe and unsafe areas of the sum area or difference area are interchanged. The unsafe half of the difference area is shaded in FIGURE 16 to illustrate this. This shading is different than that of the safe area.

The transmitted frequency when received of course can be modulated with a fixed frequency to obtain the desired frequency for modulating with the "receiving" frequency.

Although I have described several embodiments of my invention it will be understood that I do ont wish to be limited to only these variations shown, and I therefore contemplate to cover in the appended claims all such modifications and variations as fall within the true spirit and scope of my invention.

I claim as my invention:

1. In combination a railway track divided into track circuit blocks each including a supply for electromotive force and a track circuit relay coil connected in parallel across the rails in the block, low impedance circuit means for electrically coupling the rails of each of said blocks with the rails of adjacent said blocks to enable the passage of a signal across the rails of said track from block to block, switch means in each said circuit means controlled by both of said coils of the said blocks joined through those said switch means to be closed when those coils are deenergized by the shorting of the rails of both of their respective blocks and opened when either (or both) of these said coils is energized.

2. In combination a railway track divided into track circuit blocks, each said block including a current supply connected across the rails of the block, relay means having its operating coil means connected across the rails of the block to be energized to operate from said supply means, circuit means for connecting adjacent said blocks, said circuit means including in series back contacts of said relay means in adjacent said blocks to close a signal transmission link substantially limited to the rails between two trains, and means for opening said contacts to enable the reenergization of said relay means after the trains leave the block.

3. In a combination as in claim 2, means supplying a track circuit signal connected across the rails at an end of each block and including in series back contacts on the relay means of that block and front contacts on the relay means of the block adjoining that end of the block, whereby the completion of this path connects the signal across the rails of the block upon the entrance of the train into that block with the next block in advance clear.

4. In combination a vehicle way, a vehicle thereon, plural electrical conductors extending along said way, first means for supplying electrical energy controlled by said vehicle to have an electrical variable representing the speed of said vehicle, second means for supplying electrical energy having a second electrical variable comparable with said first varibale and representing substantially a limiting speed for said vehicle, circuit means applying said second variable across said conductors, said vehicle having means completing the circuit of said second variable across said conductors, means on said vehicle for receiving from said circuit said second variable, means on said vehicle for comparing said first and second variables and effecting speed control for said vehicle according to the speed difference between said vehicle and said limiting speed.

5. A railway signaling system comprising, a railway track having two rails, a first and a second vehicle on said track and separated a distance from each other, circuit loop means, said circuit loop means being formed by said two rails and portions of said vehicles substantially shorting said rails, said first vehicle carrying inductive transmitter means, said transmitter means being operable to provide signals having frequencies varying responsively to variations in vehicle speed, said frequencies varying within a predetermined band, said transmitter means being inductively coupled endward beyond the rail shorting axles of the vehicle to at least one rail to induce said signals substantially in one direction from said first vehicle, said loop circuit serving to carry said signal to said second vehicle, said second vehicle carrying inductive receiver means for receiving from said loop means signals sent by said transmitter means, and means on said second vehicle connected with said receiver to utilize said signal for speed control of said second vehicle according to the speed of said first vehicle.

6. In combination a vehicle way, a first and a second vehicle thereon, plural electrical conductors extending along said way, at least one said conductor having insulators defining control blocks therealong, first means for supplying electrical energy having a first electrical variable controlled by said first vehicle to represent the speed of said first vehicle, second means supplying electrical energy having a second electrical variable comparable with said first variable and controlled by said second vehicle to represent the speed of said second vehicle, circuit means applying electromotive force of said first variable across said conductors at the end of said first vehicle facing said second vehicle, third electrical means on said second vehicle completing the circuit of said second variable electromotive force across said conductors, means on said second vehicle for receiving said first variable comparing means on said second vehicle connected with said second and third electrical means for comparing said first and second variables and effecting control according to the speed difference between said vehicles, means for coupling adjacent said control blocks to bypass said insulators between said vehicles when within a predetermined number of blocks apart so as to pass said electromotive force.

7. In a signaling system the combination of a first frequency source for providing a frequency representing the speed of a first vehicle, a second frequency source providing a frequency representing the speed of a second vehicle with the same range of frequency variation with equal speed variation as provided by said first source for the same range of speed variation of said first vehicle but within a different frequency band than the frequency provided by said first source, a modulator connected to combine the frequency of said first source with the frequency of said second source to produce side band frequencies, a band-pass filter connected to the output of said modulator and tuned to pass a frequency within the particular resulting half side band a frequency in which represents that the first vehicle is traveling slower than the second and tuned to attenuate other frequencies and means connected to be operated by the signal passed by said filter to determine which vehicle is faster for control purposes.

8. In a railway signaling system, a railway track, trains thereon each having; transmitter means providing two frequencies each having a variable portion controlled by the train to vary similarly with train speed the two frequencies each lying in a separate frequency band to represent a particular train speed with substantially the same frequencies on each train, coils inductively mounted with respect to the rails at both ends of each train, circuit means including a reverse switch connected to determine the front from the rear and connecting a particular output of said transmitter across said coils at the front and the other output across coils at the rear, two band passes connected each to a said coil through said switch, a modulator for each said band pass, each said band pass being tuned to pass only the band opposite from said band supplied to said coils by the transmitter, a second source of frequency proportional to train speed, two modulators and means connecting each said modulator to a said band pass and both said modulators to said second source to modulate the output of each band pass with the frequency of said second source, the frequency of said second source being such that when modulated with a frequency received at the front a resulting frequency within a certain band will represent a safe speed and when modulated with a frequency received from the rear a resulting frequency within a certain band will represent the approach of a train from the rear.

9. In a system as in claim 8, each said transmitter means comprising a differential generator for each output frequency band, said generator having two rotating members comprising the field and the armature, means for driving one said member at a speed proportional to train speed, means for driving the other said member at the same speed electrically on each said train, said railway track having two rails and track circuit blocks, a bypass around each rail insulator for the transmitted signal, relay means controlled by each two adjacent blocks to cooperatively close said bypasses between the blocks between two trains on said track when within a predetermined number of blocks apart, said relay means being controlled by the track circuits of a plurality of adjacent blocks including at least the two adjacent blocks connected thereby, means for opening said bypass between trains farther apart, the rails of said track and the wheels and axles of each of two successive trains within the number of blocks electrically connected completing a loop circuit by which the inductive signals are transmitted between these trains, said coils being so positioned relative to the rail to transmit and receive only in substantially one direction along said track, means for applying a clear track code across the rails ahead of each train when the blocks ahead are not bridged, said code having a frequency to equal the signal transmitted by said transmitter means to equal the signal from a train traveling at a desired maximum speed so as to be picked up by said receiving coil at the front of a train.

10. A railway signaling system comprising in combination, a railway track having two rails insulated apart, a first train and a second train both on said track each shorting the rails of said track with their wheels and axles, the rails between and portions of the trains forming a low resistance signal loop, a first source of frequency on said first train for providing an output frequency which comprises a constant frequency plus a frequency controlled by said first train to be proportional to the speed of said first train, inductive transmitting means at the end of said first train facing said second train and beyond the wheels which short the rails and inductively related to at least one of the rails within the loop and energized from said first source to place the output signal of said source on the loop, an inductive receiver on said second train inductively related with at least one rail within the loop to receive a signal therefrom from said first source, a second source of frequency on and controlled by said second train for providing an output frequency proportional to the speed of the second train within a frequency band outside the range of the frequency output of said first source, means on said second train connected to said receiver and to said second source to modulate the output frequencies of said first and second sources and filter means connected to the output of said modulator to pass a band of frequencies which indicate a safe speed difference between said trains, and means connected to the output of said filter means to respond to current passed by said filter to direct control of the vehicle.

11. A railway signaling system including in combination, a railway track divided into successive track circuit blocks comprising insulators separating the rails at intervals along the track and track circuit relay means and current supply therefor connected in parallel across the rails between insulators, said relay means having front and back contacts in each block, trains on said track shorting the rails thereof, means controlled by said relays for connecting a predetermined number of blocks between trains so as to form a low resistance current transmission loop including the wheels and axles of successively spaced trains and the rails of said track between trains within a predetermined distance apart sufficient to stop the trains before meeting, first frequency means for supplying a frequency signal comprising a constant frequency plus a frequency controlled by the train to vary proportional to train speed on each said train similarly representing train speed and including inductive coil means in inductive relation with the said loop at the rear of each said train to transmit said signal to said loop, a receiver on each said train for inductively receiving said signal from said loop between that train and the forward said train, each said train having second frequency means controlled by the train to provide an output frequency which varies proportional to train speed in predetermined relation to said first frequency means, a modulator on each said train for modulating the output of said receiver and said second frequency means, the relations between the frequencies of said first and second frequency means being such that a frequency within half of a certain sideband output of the modulator represents a safe speed difference relative to the train ahead, and control means connected to said modulator responsive to operate on only a frequency within said band to permit said train to operate at speed, means for applying a second signal across the rails of each block ahead of each train when the track through back contacts of the relay means in that block and in series through front contacts of the relay in the next block in advance, said second signal permitting said train to operate when not receiving the frequency signal from a train ahead.

12. In a system as in claim 11, said second signal having a frequency equal to that of said frequency signal representing a train traveling away at a speed which designates a desired speed limit for the train which receives said signal, so that said second signal is received by said receiver and modulated by said modulator to operate said control means only when the train is traveling at a speed less than a speed limit determined by said signal.

13. A railway signaling system comprising in combination, a railway track having two rails, a first and a second vehicle on said track and separated by a distance therebetween, circuit loop means, said loop means being formed by said two rails and portions of each said vehicle, inductive transmitter means on said first vehicle, said transmitter means being controlled by said vehicle to vary its frequency responsively to variations in vehicle speed so as to represent the vehicle's speed with a particular frequency, said frequency varying within a predetermined band, said transmitter means and said loop means being coupled and operative to direct said signals substantially in one direction from said first vehicle along said track to said second vehicle, said second vehicle carrying receiver means for receiving from said loop means signals sent by said transmitter means, a variable frequency generator on said second vehicle controlled by said second vehicle for providing an output frequency representing the speed of that vehicle relative to the frequency of said transmitter, modulator means on said second vehicle for modulating signals received by said receiver means with signals from said generator, and frequency selective signal means operated by particular frequencies passed by said modulator means, said transmitter and receiver means varying their frequency with the speed of their respective vehicles in such a relative direction and the bands of frequency modulated by said modulator means being so selected that a particular side band output of said modulator means includes two groups of frequencies, one group determinate of a safe speed difference between said first and second trains and the presenec of the frequency in the other group being indicative of an unsafe condition, said signal means being indicative of which group the frequency is in.

14. In a system as in claim 13, the frequencies of said transmitter means and said generator each increasing substantially similarly with the speed of their respective vehicles each within a band exclusive of the other, said groups being each an opposite symmetrical half of the lower side band.

15. In a system as in claim 14, the frequency band of said transmitter being above that of said generator, said signal means responding to a frequency within the upper half of the lower side band resulting from the modulation to indicate on a safe speed signal.

16. In a system as in claim 14, said transmitter having and output frequency band below that of said generator, said signal means responding to a frequency within the lower half of the lower side band resulting from the modulation to indicate on a safe speed signal.

17. In a system as in claim 13, the frequencies of said transmitter means and generator being controlled to vary substantially linearly and equally in opposite directions with the speed of their respective vehicles, said signal means being operated by a signal having a frequency within a symmetrical half of the upper side band.

18. In a system as in claim 17, the frequency bands of said transmitter means and generator being one within the other.

19. In a system as in claim 17, said transmitter means increasing its frequency with vehicle speed, said generator decreasing its frequency with vehicle speed, said signal means being operated by the upper half of the upper band resulting from the modulation to operate on a safe speed signal.

20. In a system as in claim 17, said transmitter means being controlled by said first vehicle to decrease its frequency with increase of speed, said generator increasing its frequency with vehicle speed, said signal means being operated by the lower half of the upper band resulting from the modulation to operate on a safe speed signal.

21. A signaling system for detecting a particular relation between the speeds of two vehicles and comprising in combination, a first and a second vehicle, a first source of frequency providing a variable frequency controlled by said first vehicle to vary in a ratio substantially proportional to the speed of said first vehicle plus a constant frequency of substantially at least the maximum said variable frequency considered under operation of this combination, a second source of frequency controlled by said second vehicle to vary in a ratio substantially proportional to the speed of said second vehicle with a change of frequency with speed substantially similar as provided by said first source, means for modulating said frequencies together, signal means including filter means coupled to said modulator to operate only on a portion of the difference frequency band resulting from the modulation, the portion of the band being selected so as to denote a particular relation between the speeds of the vehicle which it is desired to detect.

22. In a combination as in claim 21, said frequencies being in the numerators of said ratios.

23. A signaling system for detecting a particular relation between the speeds of two vehicles and comprising in combination, a first source of frequency controlled by the first vehicle to vary in a ratio substantially proportional to the speed of said first vehicle, a second source of frequency controlled by the second vehicle to vary in a ratio substantially proportional to the speed of said second vehicle with a change of frequency with speed substantially inversely similar as provided by said first source, means for modulating said frequencies together, signal means including filter means connected with said modulator to operate on only a portion of the sum frequency band resulting from the modulation, the portion of the band being selected so as to denote a particular relation between the speeds of the vehicles which it is desired to detect.

24. A railway signaling system comprising a railway track having two rails, a first and a second vehicle on said track and separated by a distance therebetween, a loop circuit formed exclusively by said two rails and portions of each said vehicle, an inductive transmitter inductively linked with said link circuit to energize the same with a signal to be transmitted exclusively to said second train, said transmitter being inductively linked with the rails between said first and second vehicles, a receiver on said second vehicle inductively linked with said loop circuit between said vehicles to limit reception to that signal coming toward the vehicle from that end, said receiver being tuned to receive signals from said transmitter.

25. In a system as in claim 24, a frequency filter connected to the output of said receiver, control means on said second vehicle connected to the output of said filter, said filter being tuned to pass only a frequency indicating a faster speed for said first vehicle, said control means being of such sensitivity as to be energized only by said signal when at no less than half its usual intensity.

26. In a system as in claim 24, said transmitter comprising an alternating current rotary generator having an output frequency within an inductive signaling band and controlled by the vehicle to vary the frequency proportional to vehicle speed within the band, and inductive transmitting coil means endward beyond the contact of the vehicle with the rails and connected across output terminals of said generator to induce a current substantially limited to said loop circuit for reception by said second vehicle when within a range requiring consideration of the relative speed between said vehicles.

27. In a system as in claim 24, a coupling switch arranged to be automatically opened by the coupling of the vehicles together, said switch being in series with the induction coil means of said transmitter which are at that end of the vehicle so that the transmitter is operative only while the end of the vehicle is uncoupled.

28. In a system as in claim 24, said second vehicle being behind said first vehicle, reverse switch means on and controlled by movement of said first vehicle to always connect said transmitter to the rear when said first vehicle is in substantial motion and reverse switch means on and controlled by movement of said second vehicle to always connect said receiver to the front when said second vehicle is in substantial motion.

29. In a system as in claim 28, said reverse switch comprising an armature driven from the wheels of the vehicle and a permanent magnet field supported to rotate to stops with the rotation of said armature, and switch contacts operaed by movement of said field.

30. A railway signaling system for comparing the speed of one vehicle to that of a signal representing a running speed and comprising in combination, a source of frequency providing a frequency representing a running speed for the vehicle, an inductive receiver for receiving said frequency signal at an end of the vehicle, electrical conductive means and inductive means connected with said source to transmit and limit the transmission of the signal to the receiver when on the near end of the vehicle, and means on said vehicle controlled by the vehicle according to its speed and connected to said receiver to modify the signal to associate and compare said signal with a representation of the speed of said vehicle to determine if the speed of the vehicle is within the limit set by said signal.

31. A system for comparing the speed of a vehicle to a speed limit for the vehicle comprising, a source of frequency providing a frequency representing a running speed for the vehicle, means for transmitting said frequency to said vehicle, means for receiving said frequency on the vehicle, and means for comparing said frequency with the speed of the vehicle so as to derive an output frequency representing whether the speed of the vehicle is within the limit set by the first said frequency, a filter tuned to only pass a frequency representing a faster limiting speed than the speed of the vehicle connected to the output of said last mentioned means, and means for controlling the vehicle connected to the output of said filter to be energized by the frequency passed thereby.

32. A sysem for comparing a first and a second quantity of like kind to determine control requirements of a said quantity according to its magnitude relative to the other said quantity which includes in combination; means for providing a frequency to represent the first quantity, means representing the second quantity in such a way as to be comparable with said frequency, means for connecting both of said forementioned means for providing an output frequency representing both said quantities and a filter in the said output circuit of last mentioned means to only pass a signal determinate of a particular said quantity being larger than the other, and means controlled by said circuit to operate to indicate which of the quantities is larger.

33. A system for controlling the speed of a vehicle with a speed limit for the vehicle comprising in combination; a frequency generator for providing a frequency representing a speed limit for the vehicle, transmission means for sending the frequency of said generator to the vehicle, a frequency receiver on said vehicle for receiving the frequency, means governed by the vehicle according to its speed to modify the frequency to produce a second frequency which represents whether said limit is exceeded, a filter for detecting a said second frequency indicating a speed lower than the limit and a device connected to said filter to be energized by frequency passed by said filter for control of the speed of the vehicle.

34. In a railway system in combination, a railway track, insulators dividing said track into blocks, track circuit relay means for each block having first contacts closed by the presence of a train in the block and second contacts opened by the presence of a train in the block, and a track circuit for each block comprising a current supply and the coil means of said relay means connected across the rails in each block, a track coder connected across the rails of each said block in series through said first contacts of the relay means for the block and said second contacts of the relay means of the block to the right, the track coder's applied signal having a frequency of a value to represent a limiting speed for a vehicle in that block.

References Cited in the file of this patent

UNITED STATES PATENTS

| | | |
|---|---|---|
| 1,114,118 | Coleman | Oct. 20, 1914 |
| 1,212,476 | Goodridge | Jan. 16, 1917 |
| 1,726,508 | Dorn | Aug. 27, 1929 |
| 1,877,626 | Loughridge | Sept. 13, 1932 |
| 1,924,821 | Dorn | Aug. 29, 1933 |
| 1,971,482 | Espenschied | Aug. 28, 1934 |
| 2,038,094 | Willing | Apr. 21, 1936 |
| 2,093,077 | Fraser | Sept. 14, 1937 |
| 2,236,136 | Gorman | Nov. 25, 1941 |
| 2,427,453 | Hadley | Sept. 16, 1947 |
| 2,509,331 | Brannen | May 30, 1950 |
| 2,605,390 | Judge | July 29, 1952 |
| 2,698,377 | Korman | Dec. 28, 1954 |
| 2,716,186 | Ford | Aug. 23, 1955 |
| 2,747,081 | McMahon | May 22, 1956 |
| 2,761,962 | Hughson | Sept. 4, 1956 |
| 2,783,369 | Weber | Feb. 26, 1957 |